UNITED STATES PATENT OFFICE.

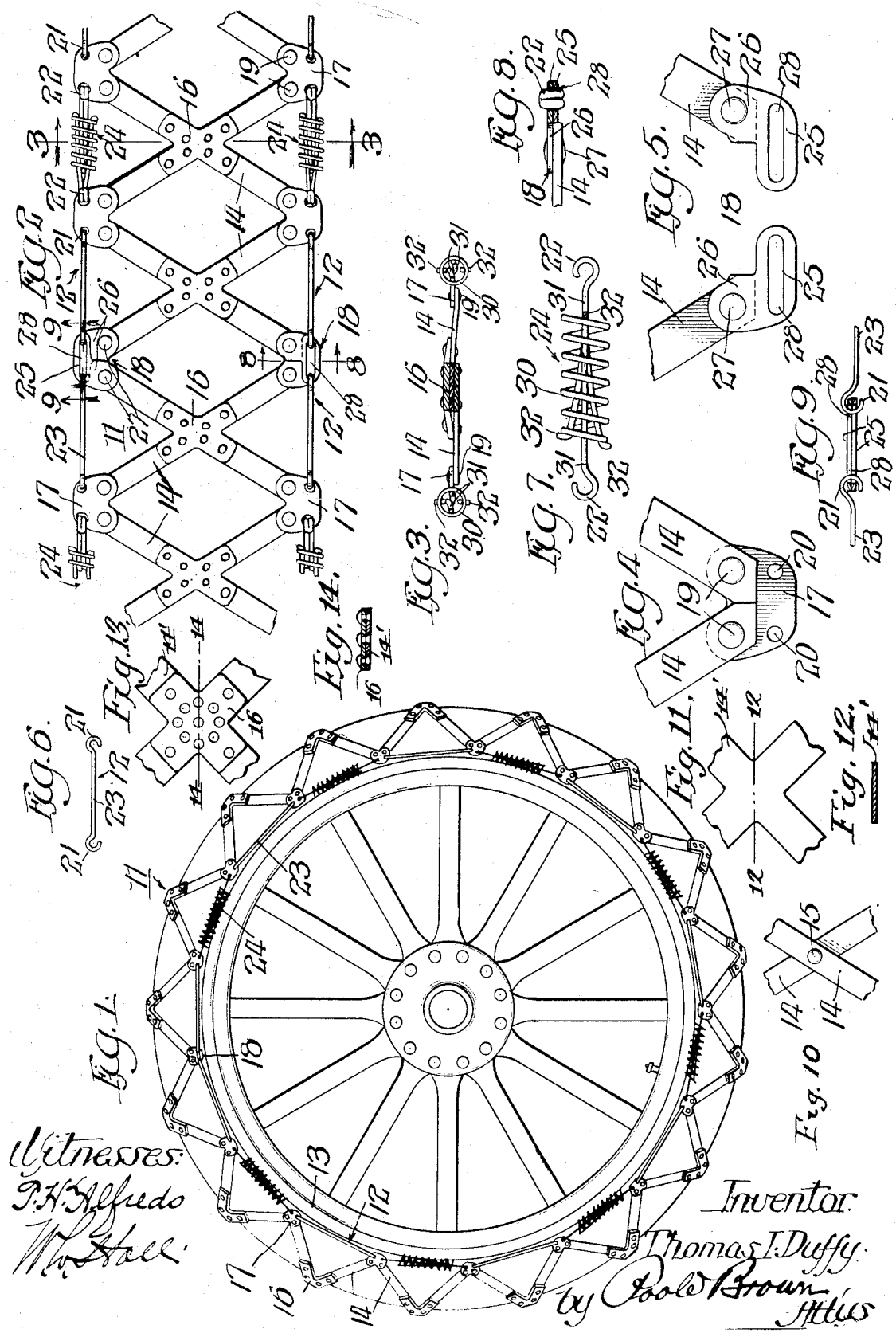

THOMAS I. DUFFY, OF CHICAGO, ILLINOIS, ASSIGNOR, BY DIRECT AND MESNE ASSIGNMENTS, OF ONE-HALF TO ANSON VERE MARTIN AND ONE-HALF TO GEORGE J. ADAM, BOTH OF CHICAGO, ILLINOIS.

ANTISKIDDING DEVICE FOR TIRES.

No. 931,284.

Specification of Letters Patent.

Patented Aug. 17, 1909.

Application filed April 20, 1908. Serial No. 428,219.

*To all whom it may concern:*

Be it known that I, THOMAS I. DUFFY, a citizen of the United States, and a resident of Chicago, in the county of Cook and State of Illinois, have invented certain new and useful Improvements in Antiskidding Devices for Tires; and I do hereby declare that the following is a full, clear, and exact description thereof, reference being had to the accompanying drawings, and to the numerals of reference marked thereon, which form a part of this specification.

This invention relates to improvements in anti-skidding tread devices for yielding tires, as pneumatic cushion or solid rubber tires, and the invention consists in the matters hereinafter set forth and more particularly pointed out in the appended claims.

Among the objects of my invention is to provide an exceedingly simple and efficient anti-skidding tread device for application to yielding tires, designed to prevent the skidding or slipping of the wheel to which the tire is attached, both in the direction of the plane of the wheel and in a direction transverse thereto; to provide a tread device which will promptly grip or take hold of the roadway, both when the wheel is started and brought to a rest from rapid motion; to provide a device of this character which will not cut or mar the roadway or the surface of the yielding tire to which it is applied; to provide a tread device which is adjustable in a limited range to tires of varying diameters and, to provide other improvements in devices of this character as will hereinafter more fully appear.

As shown in the drawings:—Figure 1 is a side elevation of a wheel having a pneumatic tire provided with my improved anti-skidding tread device. Fig. 2 is a plan view of a section of the tread device spread out flat. Fig. 3 is a detail section taken on line 3—3 of Fig. 2. Fig. 4 is an enlarged detail, showing a clip for joining the tread strips or members of the device to the side attaching members. Fig. 5 illustrates a form of a two part clip for joining the tread strip to the side members at the point where the device parts or is separated to facilitate its attachment to and detachment from the tire. Figs. 6 and 7 are details of links constituting parts of the side attaching members. Fig. 8 is a detail section, taken on line 8—8 of Fig. 2. Fig. 9 is a detail section taken on line 9—9 of Fig. 2. Fig. 10 illustrates a modified means of joining the tread strips at their points of intersection. Fig. 11 is a detail illustrating a modification of the tread grip member. Fig. 12 is a section taken on line 12—12 of Fig. 11. Fig. 13 is a similar view showing a further modification. Fig. 14 is a section taken on line 14—14 of Fig. 13.

As shown in the drawings, 10 designates a pneumatic tire and 11 designates, as a whole, my improved anti-skidding tread device applied thereto. Said anti-skidding tread device embraces two laterally separated, parallel attaching members 12, 12 and a plurality of obliquely transverse strips 14 extending between and connected to said attaching members. The said attaching members lie against the opposite sides of the tire, when the device is in place, adjacent to the rim 13 of the wheel, and each comprises a ring like member, preferably made of a plurality of links or jointed sections. Said strips 14 are made of flexible, relatively yielding friction inducing material, such as leather, rubber or the like, which permits the device, as a whole, to accommodate itself closely to the exterior of the tire. Strips made of this material possess an efficient gripping action against the roadway, and also avoid injury to the roadway and the surface of the tire, such as would occur if the strips be made of metal. Said strips are arranged in crisscross or latticed relation with respect to each other. The intersecting strips or tread members may be separately made and arranged to cross each other and to be secured together at their crossing points, or each two intersecting strips or members may be made of a single piece $14^1$ of material cut or molded in the general form of the letter X, as shown in Figs. 11 and 12, it being obvious that the same general results will be secured in either arrangement. When separate crossing strips are employed, they may be joined at their intersection by rivets 15, or like fastening devices, as shown in Fig. 10, or they may be connected by centrally arranged tread or reinforcing pieces 16 overlying said strips at their points of intersection and attached thereto in any suitable manner. Likewise, such reinforcing pieces 16 may be employed to strengthen the central intersecting parts or strips or members made from a solid or integral piece of material, as shown in Figs. 13 and 14. The employment of the reinforcing pieces with either of the constructions referred to is advantageous for the reason that they reinforce the tread strips and members at their points of intersection and strengthen the device. Such arrangement also presents additional lateral gripping surface for contact with the roadway, by increasing the depth of the V-shaped shoulders which constitute one of the active gripping features of the device. Said reinforcing pieces and the X-shaped central tread portions are made of a tough material, such for instance as chrome leather, material of this character possessing the required durability and frictional properties. They are shown as attached to the tread members by rivets which serve also as a means of protecting the flexible material from too rapid wear, while at the same time permits the full effect of the gripping action of said parts to be exerted on the roadway.

The flexible X or cross-shaped central tread members which cover the principal portion of that part of the tire which ordinarily has contact with the roadway, may be regarded as, and is, the primary antifriction factor of the device, which members are connected to the side attaching members by the oblique strips 14. Said latter members afford not only means for connecting the active factors of the anti-skidding device to the side attaching members, but constitute also in themselves means for preventing the skidding of the tire when they are engaged with lateral facing surfaces of the roadway, and also means for protecting the tire in the latter situation. The said grip or tread strips 14 are connected at their ends with the side attaching members 12 through the medium of special clips 17 and 18, the latter being located at the points of parting of the device. The clips 17 are made of single pieces of sheet metal, flat against the inner faces of which the strips 14 lie, as shown in Figs. 3 and 4. Said clips are provided at their inner sides with apertures through which extend rivets 19 by which the strips are fastened to said clips. The sides of the clips exterior to the ends of the tread strips are formed with openings 20 which receive hooks 21 and 22 formed on the ends of the links or sections 23 and 24, respectively, which make up the side attaching members of the device. Said clips constitute joints or sections of the attaching side members, which latter are thus given a desired degree of flexibility.

The clips 18 located at the opposite sides of the tread device at the parting thereof are made of two like shaped members 25, 25, each comprising a body portion having a lug 26 to which the adjacent ends of the tread strips are attached, as by the rivets 27. The body portions of the members of the two part clips lie one over the other, as shown in Figs. 2 and 8, and are provided with openings 28 which, when the members of the clip are assembled, aline with one another to provide openings at the ends of the clips to receive the hooks 21 of the links 23, as best shown in Figs. 2 and 9. The hooks 21, when inserted through said alined openings constitute means for locking the two members of the clip together. The said two part clips when thus assembled and locked together are of substantially the same shape as the single piece clips 17. By reason of their separability and of their opposite location, the release of the hooks 21 therefrom enables the tread device to be parted to facilitate its removal from the tire.

Certain of the links constituting the attaching side members are yielding or spring links, while the others are inextensible links. The links 23 are inextensible, being made of short rods which are formed at their ends to provide the hooks 21. The links 24 are spring or yielding links. The springs of the spring links are preferably compression springs. Each of the links 24 comprises a spiral, compression spring 30 and two shank portions 31, 31 on the outer ends of which are formed the hooks 22. Each of said shanks comprises a single piece of wire which is folded between its ends, and the folded or closed parts of which are formed to provide the hooks 22. The free or double ends of said shanks are inserted through the springs 30 from opposite directions and are spread apart and turned outwardly to provide lugs 32 which interlock with the end coils of the spiral spring in the manner most clearly shown in Fig. 7. Thus when pulling stress is exerted on the shanks in opposite directions, the springs are placed under compression and the compressive force thereof serves to hold the side attaching members snugly down against the base of the tire and closely conforms the tread device to and hold it firmly on the tire.

By reason of the diagonal arrangement of the tread strips and their connection with the side attaching members, and the flexibility of the tread strips, the said strips are capable of limited angular or pivotal movement relatively to said side attaching members in the general manner of lazy-tong constructions, which permits the tread device to be adjusted to tires of varying diameters and to accommodate itself closely to the contour of the tire. Such capacity for adjustment is emphasized when the construction indicated in Fig. 10 is employed, inasmuch as this construction admits of free pivotal connection between the tread members at their points of intersection.

An important feature of the invention resides in the arrangement of the flexible X or cross-shaped tread or gripping member, made of tough durable leather and like compressible material, as shown, inasmuch as the flexible nature thereof enables said members to accommodate themselves closely to the tire and to follow the undulating movements of the tire wall, while at the same time avoiding cutting of the surface of the tire, as would occur if the grip members be made of metal or like hard material. The laterally facing V-shaped gripping shoulders of said grip members may be made as deep as desired and present an admirable grip surface when the members are made of flexible relatively soft material possessing high frictional efficiency, inasmuch as such grip shoulders are enabled to closely grip the roadway regardless of the regularity or irregularity of the roadway. Moreover the grip members made as described do not cut or mar the roadway or the surface of the tire. Moreover, the compressibility of the material has the effect to slightly thicken and compress the lateral edges of the tread members at and near the angles between the arms thereof when stress is thrown thereon by reason of the sliding of the tire either laterally or in the plane of its rotation. By reason of this action of the material at the angles indicated, the efficiency of the device to grip the roadway is considerably increased as compared to a device of this general nature without such angular holding surfaces and which is not soft, flexible and compressible.

The making of the tread strips of a yielding and flexible material is advantageous, both by reason of the fact that it permits the tread device to be fitted closely to the tire and to be adjusted to tires of different diameters and also because it avoids cutting the roadway and injuring the envelop of the tire, as may be occasioned by metallic or other relatively hard tread members or strips.

It will be obvious that the details of construction of the several parts of the device may be varied without departing from the spirit of the invention and I do not wish to be limited to such details except as hereinafter made the subject of specific claims. For instance, one of the essential features of the side attaching members is a spring or yielding construction which operates to hold the tread devices closely on the tire and obviates the necessity of accurately fitting said device to a tire of a given size. Any construction of the side attaching members therefore which possesses this feature is regarded as falling within my invention.

I claim as my invention:—

1. An anti-skidding tread device for tires comprising X-shaped tread members adapted to the center of the tread of a tire and made of tough non-metallic flexible and compressible friction-inducing material, and means for fastening said members on a tire tread.

2. An anti-skidding tread device for tires comprising X-shaped tread members adapted to the center of the tread and made of tough non-metallic flexible and compressible friction-inducing material, and attaching means connected with and extending from said tread members, made of a material like the tread members and arranged to be fastened at their ends to side attaching means lying at the sides of the tire.

3. An anti-skidding tread device for tires, arranged to be transversely separated for removal from a tire comprising a plurality of transverse tread members and flexible side attaching members, the latter embracing a plurality of clips to which the tread members are attached at their ends, two opposite clips, located one at each side of the device, at the point of transverse separation, being made of two separable members, to each of which is attached one of the tread members.

4. An anti-skidding tread device for tires, arranged to be transversely separated for removal from a tire, comprising a plurality of transverse tread members and flexible side attaching members, the latter embracing a plurality of clips to which the ends of the tread members are attached and a plurality of links flexibly connecting said clips, two opposite clips, located one at each side of the device at the point of transverse separation, being made of two separable members which lie one over the other and are provided with alined openings, the associated links extending through said alined openings to lock the members of the two-part clips and the ends of the device together.

In testimony, that I claim the foregoing as my invention I affix my signature in the presence of two witnesses, this 15th day of April A. D. 1908.

THOMAS I. DUFFY.

Witnesses:
W. L. HALL,
G. R. WILKINS.